US011882623B2

(12) United States Patent
Palli et al.

(10) Patent No.: US 11,882,623 B2
(45) Date of Patent: Jan. 23, 2024

(54) SUBSCRIBER INFORMATION MANAGEMENT IN A NETWORK

(71) Applicant: Charter Communications Operating, LLC, St. Louis, MO (US)

(72) Inventors: Peter H. Palli, Snellville, GA (US); William K. Logan, Overland Park, KS (US)

(73) Assignee: Charter Communications Operating, LLC, St. Louis, MO (US)

( * ) Notice: Subject to any disclaimer, the term of this patent is extended or adjusted under 35 U.S.C. 154(b) by 218 days.

(21) Appl. No.: 17/177,466

(22) Filed: Feb. 17, 2021

(65) Prior Publication Data
US 2022/0264285 A1    Aug. 18, 2022

(51) Int. Cl.
*H04W 8/20*    (2009.01)
*H04W 4/60*    (2018.01)
*H04W 76/12*   (2018.01)
*H04W 12/42*   (2021.01)
*H04W 24/08*   (2009.01)

(52) U.S. Cl.
CPC ............... *H04W 8/20* (2013.01); *H04W 4/60* (2018.02); *H04W 12/42* (2021.01); *H04W 24/08* (2013.01); *H04W 76/12* (2018.02)

(58) Field of Classification Search
CPC ......... H04W 8/20; H04W 4/60; H04W 12/42; H04W 24/08; H04W 76/12; H04W 12/35; H04W 12/40; H04W 8/205; H04W 12/61; H04W 8/245; H04L 63/18
See application file for complete search history.

(56) References Cited

U.S. PATENT DOCUMENTS

| 2004/0166839 | A1* | 8/2004 | Okkonen | H04M 1/72406 455/418 |
| 2014/0011478 | A1* | 1/2014 | Collins | H04W 48/06 455/411 |
| 2015/0236970 | A1* | 8/2015 | Rahman | H04W 4/20 370/216 |
| 2016/0134625 | A1* | 5/2016 | Song | H04W 12/126 455/411 |
| 2019/0075448 | A1* | 3/2019 | Prakash | H04W 8/183 |
| 2020/0264857 | A1* | 8/2020 | Koo | G06Q 20/326 |
| 2022/0014900 | A1* | 1/2022 | Gandhi | H04W 12/40 |
| 2022/0141669 | A1* | 5/2022 | Daumer | H04W 12/126 726/23 |
| 2022/0182810 | A1* | 6/2022 | Kim | H04W 48/18 |
| 2023/0074288 | A1* | 3/2023 | Filippou | H04W 28/0236 |

* cited by examiner

*Primary Examiner* — Mazda Sabouri
(74) *Attorney, Agent, or Firm* — Armis IP Law, LLC

(57) ABSTRACT

According to one configuration, a mobile communication device is in communication with a network. During operation, the mobile communication device executes a monitor application associated with embedded SIM (Subscriber Identity Module) information downloaded to programmable hardware of the mobile communication device. The monitor application is received as a portion of the embedded SIM information. Via the executed monitor application: the monitor application monitors a status of the embedded SIM information and then communicates the status over a network to a remote communication management resource.

37 Claims, 10 Drawing Sheets

SUBSCRIBER INFORMATION MANAGEMENT IN A NETWORK

BACKGROUND

A subscriber identity module or subscriber identification module (SIM), also known a SIM card, is an integrated circuit that is used to securely store information such as the international mobile subscriber identity (IMSI) telephony number and its related key information. Such information is used to identify and authenticate subscribers on mobile communication devices when they use a respective wireless network.

A conventional SIM circuit is part of the function of a Universal Integrated Circuit Card (UICC) physical smart card, which is usually fabricated from a plastic material embedded with contacts and a corresponding semiconductor circuit.

Conventional SIM information in a SIM card is transferable between different mobile devices.

A conventional SIM card stores subscriber information such as a unique serial number (ICCID), international mobile subscriber identity (IMSI) number, security authentication and ciphering information, temporary information related to the local network, a list of the services the user has access to, and two passwords such as a personal identification number (PIN) for ordinary use, and a personal unblocking key (PUK) for PIN unlocking.

Newer technology supports so-called embedded SIM information. An embedded-SIM (eSIM) or embedded universal integrated circuit card (eUICC) is a form of programmable SIM card that is embedded directly into a mobile communication device.

BRIEF DESCRIPTION OF EMBODIMENTS

This disclosure includes the observation that there are deficiencies associated with conventional techniques of supporting wireless communications using standard SIM cards. For example, as previously discussed, subscribers eventually will be able to download eSIM information from telecom carriers to subscriber for services as opposed to installing a physical SIM card in a phone device. However, the telecom provider needs a way to track eSIMs and ensure that the latest eSIM status is received from each of the eSIMs in the field.

Certain embodiments herein include an applet executed on the eSIM that provides an "out of band" way of providing eSIM status (such as via eSIM states) to a respective wireless network service provider. Such a function is useful due to non-guaranteed existence of links to the subscriber's mobile device. Communications from a monitor applet as discussed herein can be communicated over any communication medium such as including conveyance of SMS (Short Message Service) messages or the mobile device's data connection.

More specifically, in accordance with further embodiments herein, user equipment (such as a mobile communication device) executes a monitor application associated with embedded SIM (Subscriber Identity Module) information. The monitor application is downloaded from the embedded SIM information to programmable hardware of the mobile communication device. For example, a local profile assistant or other suitable entity of the mobile communication device installs the monitor application onto the mobile communication device for execution by the programmable hardware. Via the executed monitor application, the mobile communication device monitors a status associated with the embedded SIM information and communicates the detected status over a network to a remote communication management resource.

In one embodiment, the status information generated by the monitor application executing on the mobile communication device (i.e., user equipment) indicates an operation applied to the embedded SIM information by a user of the mobile communication device during the monitoring. For example, if the user of the mobile communication device modifies the embedded SIM information, the executed monitor applet queues the detected event and provides notification of the modification to a respective remote communication management entity such as operated by the wireless network service provider. Accordingly, the wireless network service provider issuing the subscriber information can track operations associated with the subscriber information and corresponding communication device.

In further example embodiments, the mobile communication device executes the monitor application (a.k.a., monitor applet) via the programmable hardware receiving the embedded SIM information.

Communication of the status associated with the subscriber information to a remote entity can result in receipt of a response from the remote entity. For example, in one embodiment, in response to communicating the status associated with the subscriber identity information (such as SIM information) over the network to the communication management resource, the monitor application can be configured to receive one or more response message over the network. In one embodiment, the one or more messages are directed to a user of the mobile communication device from the communication management resource.

In accordance with yet further example embodiments, the executed monitor application is supplemental with respect to a SIM management application executed on the mobile communication device. In such an instance, the SIM management application communicates a status of the subscriber information and SIM device over a first communication link to the wireless network service provider. The supplemental monitor application executed on the mobile communication device as discussed herein monitors the status of the embedded SIM information and provides notification of the status over an auxiliary wireless connection to the remote communication management resource (wireless network service provider).

In one embodiment, the auxiliary connection (such as a data connection) is established by the user of the mobile communication device to support access to a respective wireless network. The monitor application communicates the status over a detected communication link (auxiliary connection) from the mobile communication device to the remotely located communication management resource. Thus, the communication device can be configured to support multiple different communication paths providing notification of a status of the eSIM information stored on the mobile communication device.

In one embodiment, the detected communication link (or auxiliary communication link is a bypass path (such as out-or-band) with respect to the primary wireless connection between the local profile assistant (eSIM application) and a remote management resource.

In still further example embodiments, the embedded SIM information (such as including the monitor application) downloaded to the programmable hardware of the mobile communication device includes a subscriber identity of a user of the mobile communication device and authentication key information supporting wireless connectivity of the mobile communication device over the network.

In further example embodiments, the executed monitor application queues the status (information) for subsequent delivery in one or more messages to the remote communication management resource until a communication link associated with the mobile communication device is available communicate the status to the remote communication management resource.

In one embodiment, the executed application monitors the mobile communication device for presence of a persistent or temporary data connection already used by the communication device to communicate over the network. The executed application selects the persistent or temporary data connection to communicate the status (information) over the network to the remote communication management resource.

In further example embodiments, the monitor application communicates the status (information) in the one or more messages over the persistent or temporary data connection to a remote location (such as a communication management resource operated by a respective wireless network service provider) unbeknownst to the user operating the mobile communication device.

Note that the monitor application can be executed by any suitable hardware in the mobile communication device. In one embodiment, the programmable hardware executing the monitor application is embedded SIM hardware residing on the mobile communication device.

In accordance with further example embodiments, the executed monitor application on the mobile communication device can be configured to detect a location of the mobile communication device in a geographical region. The monitor application then communicates the location information indicating the location of the mobile communication device of the remote communication management resource (wireless network service provider). Accordingly, the wireless network service provider is aware of a location of the mobile communication device. If desired, the monitor application receives one or more messages from a remote management entity (such as communication management resource) for display on a respective display screen of the mobile communication device.

Embodiments herein are useful over conventional techniques. For example, embodiments herein provide a unique way to provide embedded SIM status information to a wireless network service provider.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein. Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon to support wireless communications using eSIM information. The instructions, when executed by the computer processor hardware, cause the computer processor hardware (such as one or more co-located or disparately processor devices or hardware) to: execute a monitor application associated with embedded SIM (Subscriber Identity Module) information downloaded to programmable hardware of the mobile communication device, the monitor application received in the embedded SIM information; via the executed monitor application: i) monitor a status of the embedded SIM information; and ii) communicate the status over a network to a remote communication management resource.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless communications in wireless network environment. However, it should be noted that embodiments herein are not limited to use in such applications and that the techniques discussed herein are well suited for other applications as well. Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
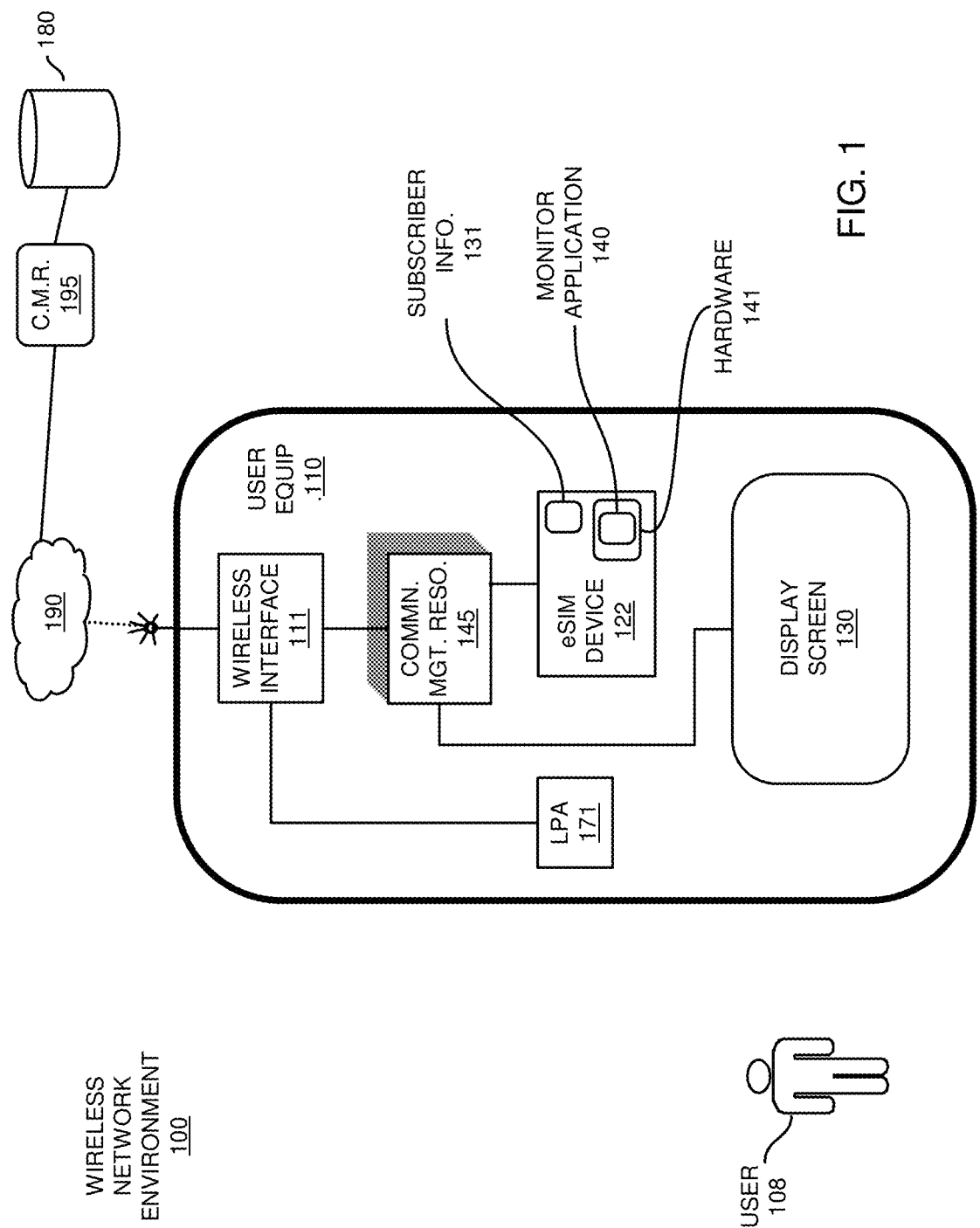
FIG. 1 is an example diagram illustrating user equipment implementing a monitor application according to embodiments herein.

The foregoing and other objects, features, and advantages of the invention(s) will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, a user downloads and installs subscriber information (such as an embedded SIM) onto a mobile communication device. The subscriber information installed on the mobile communication device includes a monitor application (such as executable code). The monitor application is executed via programmable hardware (such as eSIM or other suitable hardware) on the mobile communication device. During operation of the mobile communication device, the monitor application monitors a status of the embedded SIM information stored on the mobile communication device. When the monitor application executed on the mobile communication device detects presence of an established communication link associated with the mobile communication device, the monitor application communicates the detected status of the subscriber information over a network to a remote communication management resource (such as associated with a wireless network service provider). If desired, the monitor application can be configured to provide notification of a status of the subscriber information on a scheduled basis such as once a day, once a week, etc.

Alternatively, the monitor application can be configured to communicate the detected status of the subscriber information based on a trigger event such as deletion of the subscriber information, disabling of the subscriber information, modification of the subscriber information, etc.

Now, more specifically, FIG. 1 is an example diagram illustrating user equipment supporting use of a monitor application according to embodiments herein.

As shown in this example embodiment, the wireless network environment 100 includes user equipment 110 operated by user 108, network 190, and communication management resource 195.

User equipment 110 includes wireless interface 111, communication management resource 145, local profile assistant 171, eSIM device 122, and display screen 130.

In one embodiment, the eSIM device 122 includes programmable hardware 141 to execute one or more applications. The eSIM device 122 also includes hardware storage to store subscriber information 131 (such as eSIM information providing the user access to a respective wireless network).

Note that each of the different components such as communication management resource 195, communication management resource 145, local profile assistant 171, etc., associated with wireless network environment 100 can be implemented via hardware, software, or a combination of both hardware and software.

More specifically, communication management resource 145 can be configured to include communication management hardware, communication management software, or a combination of communication manager hardware and communication management software; monitor application 140 can be configured to include monitor hardware, monitor software, or a combination of monitor hardware and monitor software; communication management resource 195 can be configured to include communication management hardware, communication management software, or a combination of communication manager hardware and communication management software; and so on.

As further shown, user 108 operates corresponding user equipment 110. In accordance with input from the user 108, the user equipment 110 (i.e., a communication device) communicates over network 190 (such as cellular network, Wi-Fi™ network, etc.) with one or more management resources such as communication management resource 195.

This disclosure includes the observation that, when a subscriber (such as user 108) downloads subscriber information 131 (such as an eSIM) onto the user equipment 110, the specifications governing use of eSIM information allow the subscriber to change the state of the subscriber information 131 (eSIM).

For example, in certain instances, the user 108 is able to disable or delete the subscriber information 131 from residing on the mobile communication device 110. There is no reliable conventional way for a respective wireless network service provider (a.k.a., telecom provider) to know about changes to subscriber information 131 (such as eSIM information) stored in the eSIM device 122 on the user equipment 110. Additionally, the wireless network service provider providing wireless service to the user equipment 110 would not be able to rely solely on mobile applications (such as local profile assistant 171) executed on the user equipment 110 to report eSIM status (such as indicating changes to the subscriber information 131) as the user 108 may delete such applications on the user equipment 110.

As further discussed herein, the user equipment 110 executes a monitor application 140. In one embodiment, the monitor application 140 is received along with the subscriber information 131 (such as embedded SIM information) and is downloaded to programmable hardware 141 of the user equipment 110 (i.e., mobile communication device). Thus, in one embodiment, the user equipment 110 receives the executable code associated with the monitor application 140 as a portion of embedded SIM information (subscriber information 131) received from a remote entity such as communication management resource 195.

As its name suggests, in one embodiment, the local profile assistant 171 on the user equipment 110 assists in downloading the subscriber information 131 and corresponding monitor application 140 onto the eSIM device 122 of the user equipment 110 for execution by the programable hardware 141. Via the executed monitor application 140, the user equipment 110 monitors a status associated with the subscriber information 131 (such as embedded SIM information) and communicates the detected status over a network to the remote communication management resource 195.

Figure 2:
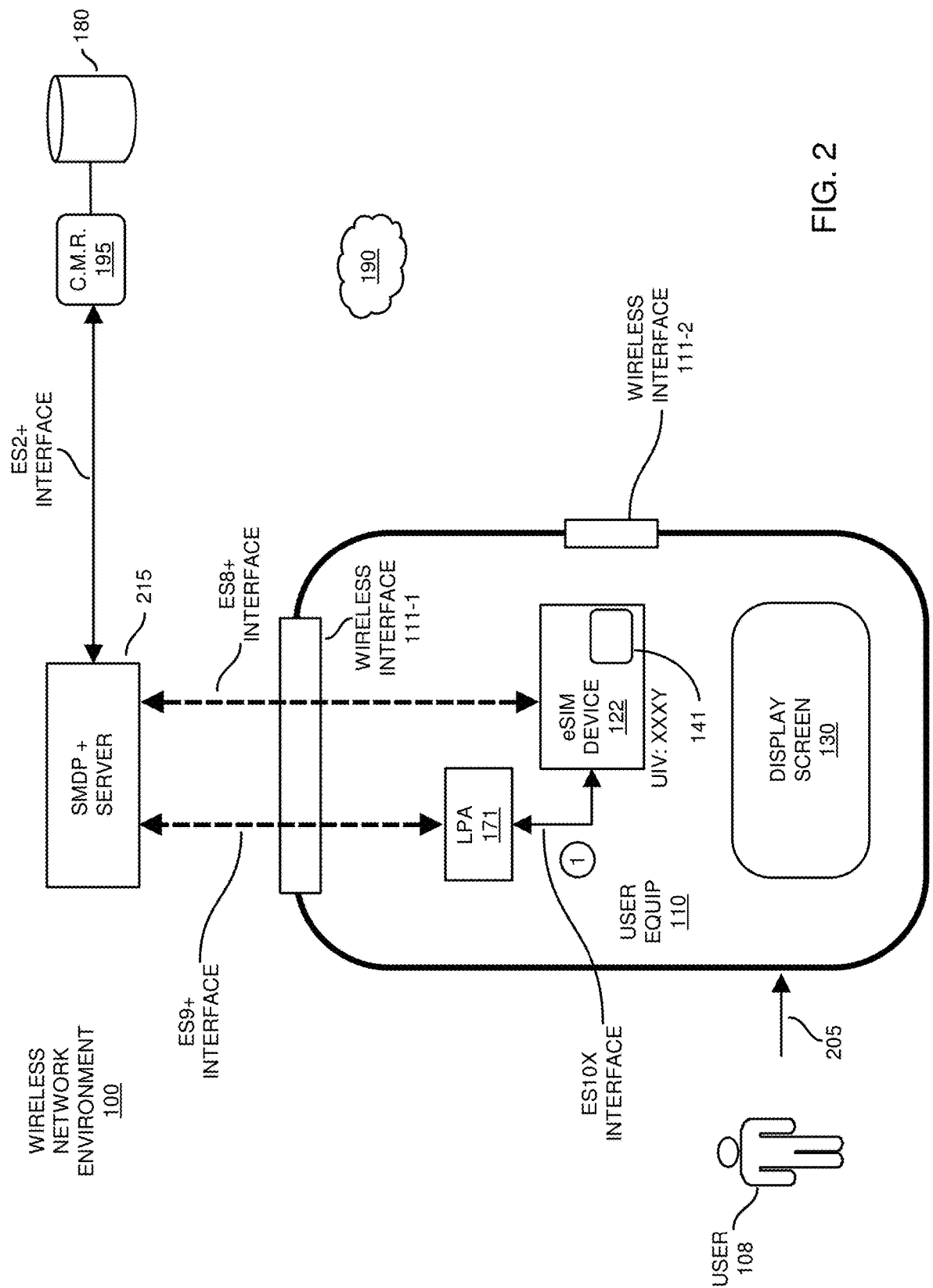
FIG. 2 is an example diagram illustrating input from a user initiating configuration of a respective mobile communication device according to embodiments herein.

FIG. 2 is an example diagram illustrating input from a user to configure a respective mobile communication device according to embodiments herein.

Assume in this example embodiment that the user equipment 110 is not yet configured to receive wireless network services associated with a wireless network service provider. In other words, the user equipment 110 needs to be programmed with eSIM information in order to use wireless network services. In such an instance, in operation #1, to configure the user equipment 110, the user 108 provides input 205 to the user equipment 110.

In one embodiment, the input 205 includes a request or actions to configure the respective user equipment to access a wireless network provided by the wireless network service provider. In response to receiving the input 205, and request to configure the user equipment with appropriate information (such as eSIM information or subscriber information 131) to support wireless connectivity, the local profile assistant 171 initiates configuration of the user equipment 110 as further discussed below.

Figure 3:
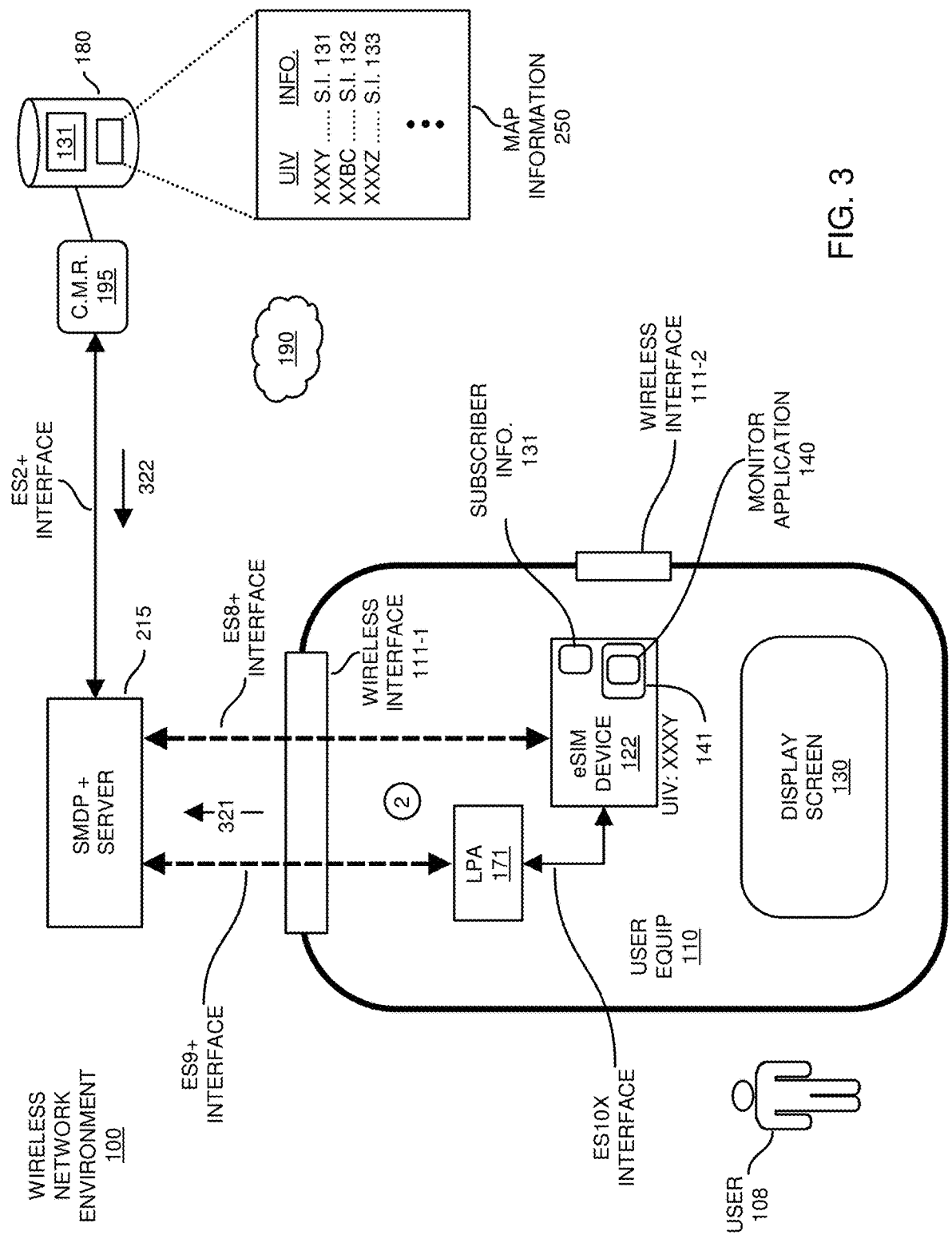
FIG. 3 is an example diagram illustrating download and installation of subscriber information according to embodiments herein.

FIG. 3 is an example diagram illustrating downloading and installation of subscriber information according to embodiments herein.

In operation #2, in response to receiving the request to configure the user equipment 110, the local profile assistant 171 communicates (such as via one or more of the ES9+ interface, ES8+ interface, ES2+ interface, etc.) with the communication management resource 195.

For example, in furtherance of configuring the respective user equipment 110, via communications 321, the local profile assistant 171 communicates the unique identifier value of XXXY (such as a unique electronic identifier value, network address, etc.) assigned to the user equipment 110 to the communication management resource 195.

The communication management resource 195 receives the request for subscriber information to operate the user equipment 110 and applies the received unique identifier value XXXY to the mapping information 250.

Based on the mapping, the communication management resource 195 determines that subscriber information 131 has been assigned for use by the user equipment 110. In such an instance, via communications 322, the communication management resource 195 communicates the subscriber information (such as eSIM information) to the user equipment 110 for storage and implementation in the eSIM device 122.

Note that the eSIM device 122 of the user equipment is segregated from other processing functions on the user equipment 110 as the eSIM device 122 is optimized to manage and implement eSIM information and corresponding functions.

In one embodiment, the subscriber information 131 includes information such as authentication credentials (such as one or more encryption keys supporting communications), identity of the corresponding wireless network service provider, subscriber phone number, voicemail number, one or more applets (such as monitor application 140), etc.

The subscriber information 131 (such as eSIM information) supports subsequent wireless connectivity of the user equipment 110 to a respective wireless network provided by the wireless network service provider.

In further example embodiments, the operation of the eSIM device 122 on the user equipment 110 and the interaction with the eSIM platform (such as communication management resource 195) over the ES2+ interface is governed by the GSMA (Global System Mobile Association) specifications as described in "SGP.22—RSP Technical Specification." The eSIM Platform (SMDP+ server 215) communicates with backend OSS (Operations Support Systems) systems (such as communication management resource 195 associated with the wireless network service provider) over the ES2+ interface. The interface oversees the flow for the preparation and reservation of the eSIM information (subscriber information 131) and state changes on the eSIM platform.

When the subscriber information 131 (such as eSIM information including monitor application 140) is downloaded onto the eSIM device 122, the state of the eSIM status as stored by the SMDP+ server 215 changes from a state of "available" to a state of "downloaded" to a state of "installed." At the same time, notifications from the eSIM device 122 are received on the SMDP+ server 215 whenever a eSIM information state change is experienced/detected on the user equipment 110.

In one embodiment, the notifications of state changes to the eSIM device 122 and/or corresponding subscriber information 131 (eSIM information) are sent to the communication management resource 195 (wireless network service provider or Network Operator) over the ES2+ interface. However, there can be issues with depending purely on these notifications because this communication link or path may not be available or working properly.

For example, although eSIM status can be captured on the eSIM platform (SMDP+ server) 215 via communication interfaces ES9+ and ES8+, there is no guarantee that the status stored by the server 215 via these interfaces is accurate because such links through wireless interface 111-1 are not guaranteed and could result in a non-delivery of eSIM status information to the server 215 or communication management resource 195.

In one embodiment, as further discussed herein, the executed monitor application 140 is supplemental with respect to a SIM management application (such as local profile assistant 171 or other application) executed on the user equipment 110.

For example, as previously discussed, a first resource such as local profile assistant 171 can be configured to provide feedback to the server 215 and/or communication management resource 195 indicating a status of the eSIM device 122 and/or corresponding subscriber information 131. More specifically, the first resource such as a local profile assistant 171 or other suitable entity can be configured to detect changes to the subscriber information 131. In such an instance, the local profile assistant 171 communicates a corresponding status (e.g., the changes) of the subscriber information 131 to a remote management entity 195 over a first or primary wireless connection (such as ES9+ interface, ES8+ interface, etc.) through the wireless interface 111-1 of the user equipment 110.

In such an instance, the monitor application 140 is a supplemental monitor application 140 executed on the user equipment 110. For example, the monitor application 140 also serves as a way of monitoring the eSIM device 122 and corresponding subscriber information 131.

As further discussed herein, the monitor application 140 monitors the status of the status information 131 (such as embedded SIM information) and provides notification of the status of such information over an auxiliary wireless connection (when available) to the remote communication management resource 195 (operated by the wireless network service provider). Assume in this example embodiment of FIG. 3 that there is no auxiliary communication link through the wireless interface 111-2 to the network 190 and corresponding communication management resource 195.

In one embodiment, as further discussed herein, the monitor application 140 awaits availability of an auxiliary communication link and communicates the status of the subscriber information 131 and corresponding eSIM device 122 over a detected communication link (such as auxiliary communication link) from the user equipment 110 to the remotely located communication management resource 195.

Figure 4:
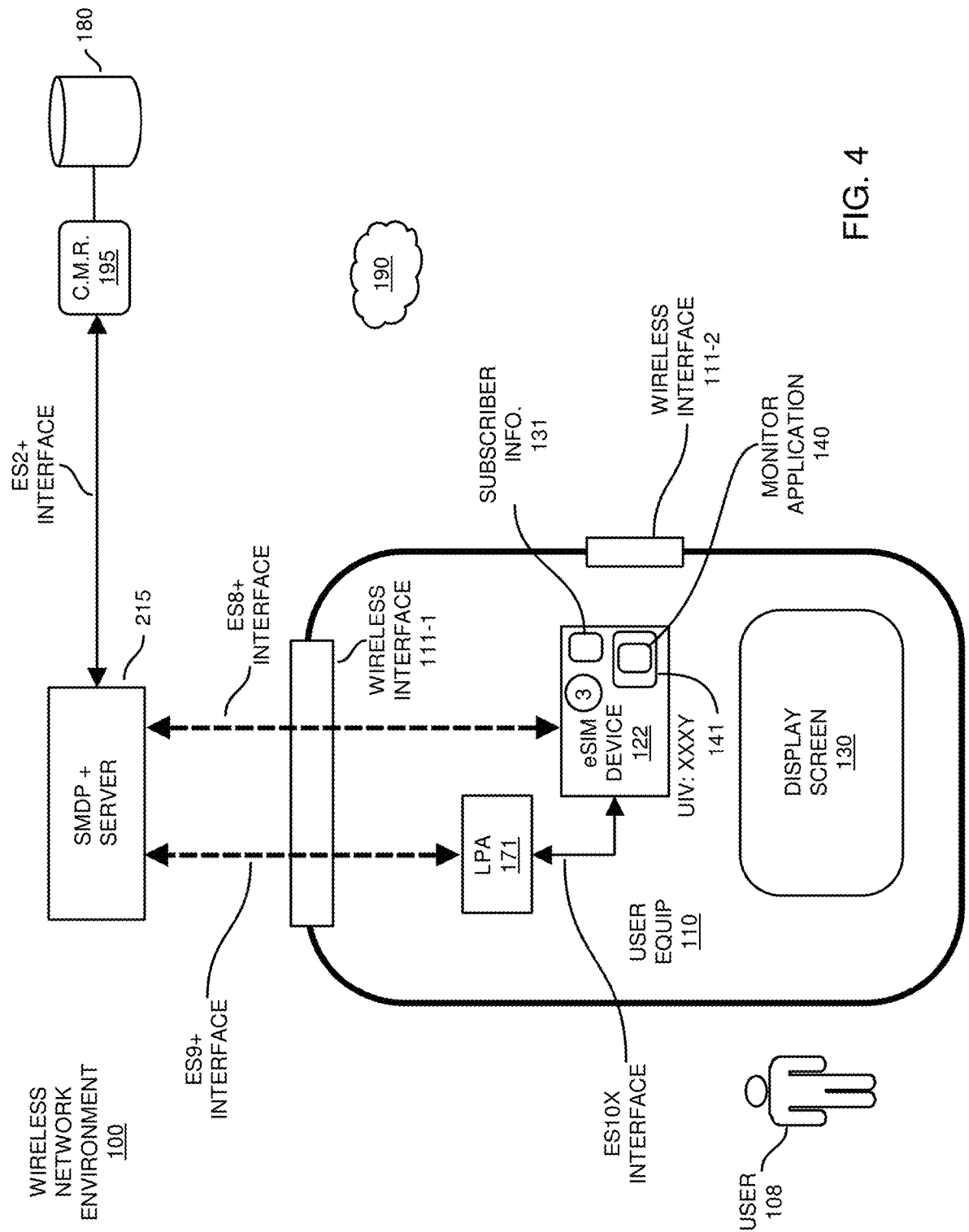
FIG. 4 is an example diagram illustrating implementation of a monitor application that monitors subscriber information according to embodiments herein.

FIG. 4 is an example diagram illustrating monitoring of subscriber information according to embodiments herein.

In operation #3, the monitor application 140 monitors eSIM device 122 and corresponding subscriber information 131.

As previously discussed, the subscriber information 131 such as embedded SIM information (such as including the monitor application) downloaded to the programmable hardware 141 of the user equipment 110 includes a subscriber identity of the user 108 of the user equipment 110 and corresponding authentication key information supporting wireless connectivity of the user equipment 110 over the wireless network environment 100.

Note again that the monitor application 140 can be executed by any suitable hardware in the user equipment 140. In one embodiment, as previously discussed, the programmable hardware 141 executing the monitor application 140 is embedded SIM hardware residing in the eSIM device 122 of the user equipment 110. Additional details of functions provided by the monitor application 140 are discussed in FIG. 5.

Figure 5:
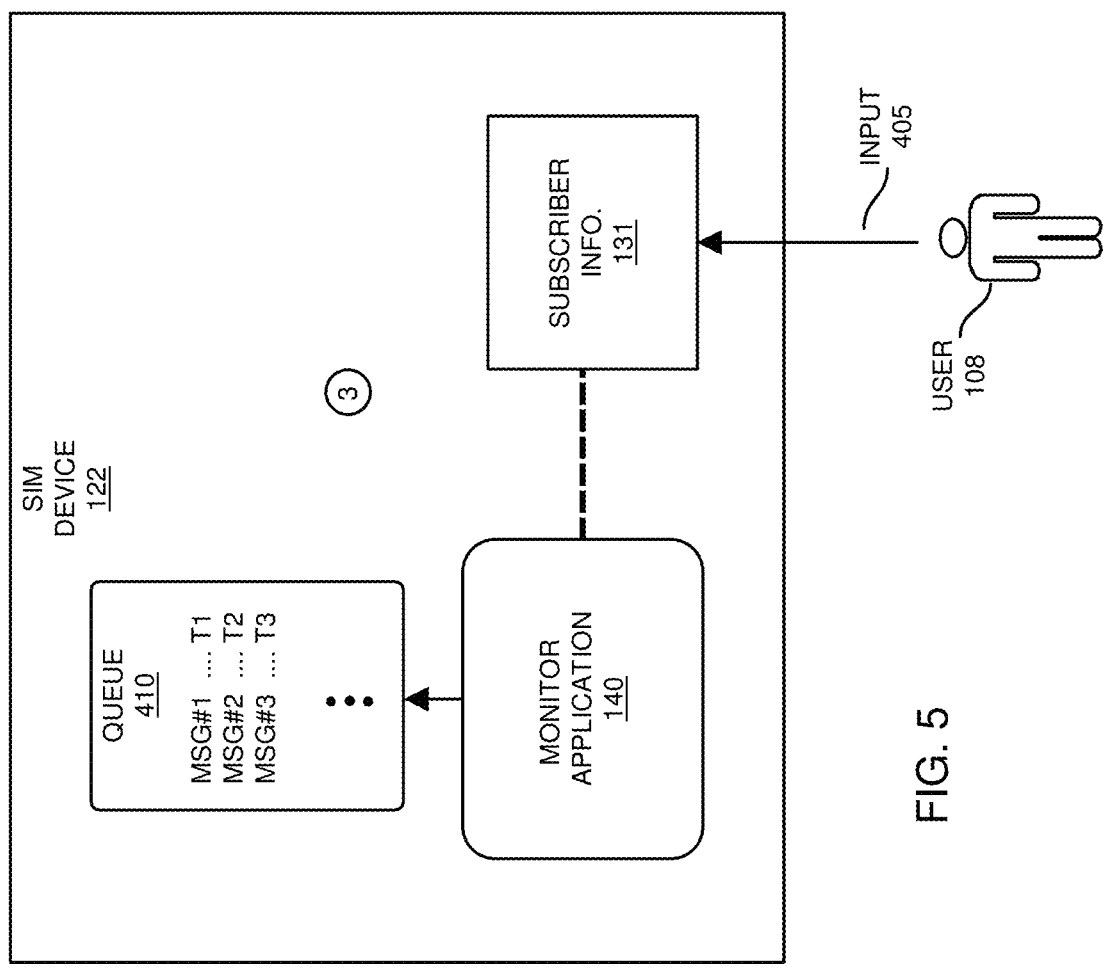
FIG. 5 is an example diagram illustrating detection of status information and queuing of messages associated with an embedded SIM according to embodiments herein.

FIG. 5 is an example diagram illustrating detection of status information and queuing of messages associated with an embedded SIM according to embodiments herein.

In further example embodiments, the executed monitor application 140 monitors occurrence of different events associated with the subscriber information 131 and corresponding eSIM device 122. For example, the monitor application 140 monitors one or more conditions (such as changes, deletion, etc., of all or a portion of the subscriber information 131).

In one embodiment, the monitor application 140 queues the status (information) associated with the detected events (such as modification, deletion, etc.) for subsequent delivery in one or more messages to the remote communication management resource 195 until a communication link in the network is established by an entity other than the monitor application 140 and is available to communicate the status to the remote communication management resource 195.

In further example embodiments, the executed monitor application 140 monitors the mobile communication device (user equipment 110) for presence of a persistent or temporary data connection used by the user equipment 110 to communicate over the network 190. In one embodiment, the monitor application 140 selects the persistent or temporary data connection from one or more available communication links to communicate the status (information) messages over the network 190 to the remote communication management resource 195.

In further example embodiments, the monitor application 140 communicates the status (information) in the one or more messages over the detected persistent or temporary data connection to a remote location (such as communication management resource 195) unbeknownst to the user 108 operating the mobile communication device. In one embodiment, the monitor application 140 queues the status information associated with the subscriber information 131 and/ or eSIM device 122 in response to detecting that an auxiliary communication link (established by the user 108) is not available to communicate the status information (message #1, message #2, message #3, etc.) from the user equipment 110 to the communication management resource 195 over network 190.

In one embodiment, the status information produced by the monitor application 140 includes one or more messages such as message #1, message #2, message #3, etc. Each of the messages indicates a respective operation applied to the status information 131 (such as embedded SIM information) by a user 108 (or other entity associated with the user equipment 110) during the monitoring.

In one embodiment, the monitor application 140 produces a respective timestamp indicating a time in which a respective event occurs. For example, the queue 410 indicates that the event (such as modification of the subscriber information 131 based on input 405) associated with message #1 occurs at time T1; the queue 410 indicates that the event (such as disabling of the subscriber information 131 and eSIM device 122 based on input 405) associated with message #2 occurs at time T2; the queue 410 indicates that the event (such as enabling of the subscriber information 131 and eSIM device 122 based on input 405) associated with message #3 occurs at time T3; and so on.

In further example embodiments, the monitor application 140 communicates the timestamp information along with corresponding messages to the communication management resource 195. In such an instance, the communication management resource 195 is able to identify when the different events occur.

As a further example embodiment, if the user 108 (subscriber) of the user equipment 110 modifies the subscriber information 131 (such as embedded SIM information), the executed monitor application 140 queues the events (as messages in queue 410) and provides notification of the one or more modifications via communication of the one or more messages in queue 410 to a respective remote communication management entity (communication management resource 195) associated with the wireless network service provider.

Thus, the wireless network service provider providing wireless service to the user equipment 110 has multiple ways of receiving notification of a status of the subscriber information 131 and/or eSIM device 122. More specifically, the local profile assistant 171 or eSIM device 122 may provide notification of a status of the subscriber information 131 and/or eSIM device 122 to the communication management resource 195; the monitor application 140 executed by the programmable hardware 141 also provides notification of a status of the subscriber information 131 and/or eSIM device 122 to the communication management resource 195.

Figure 6:
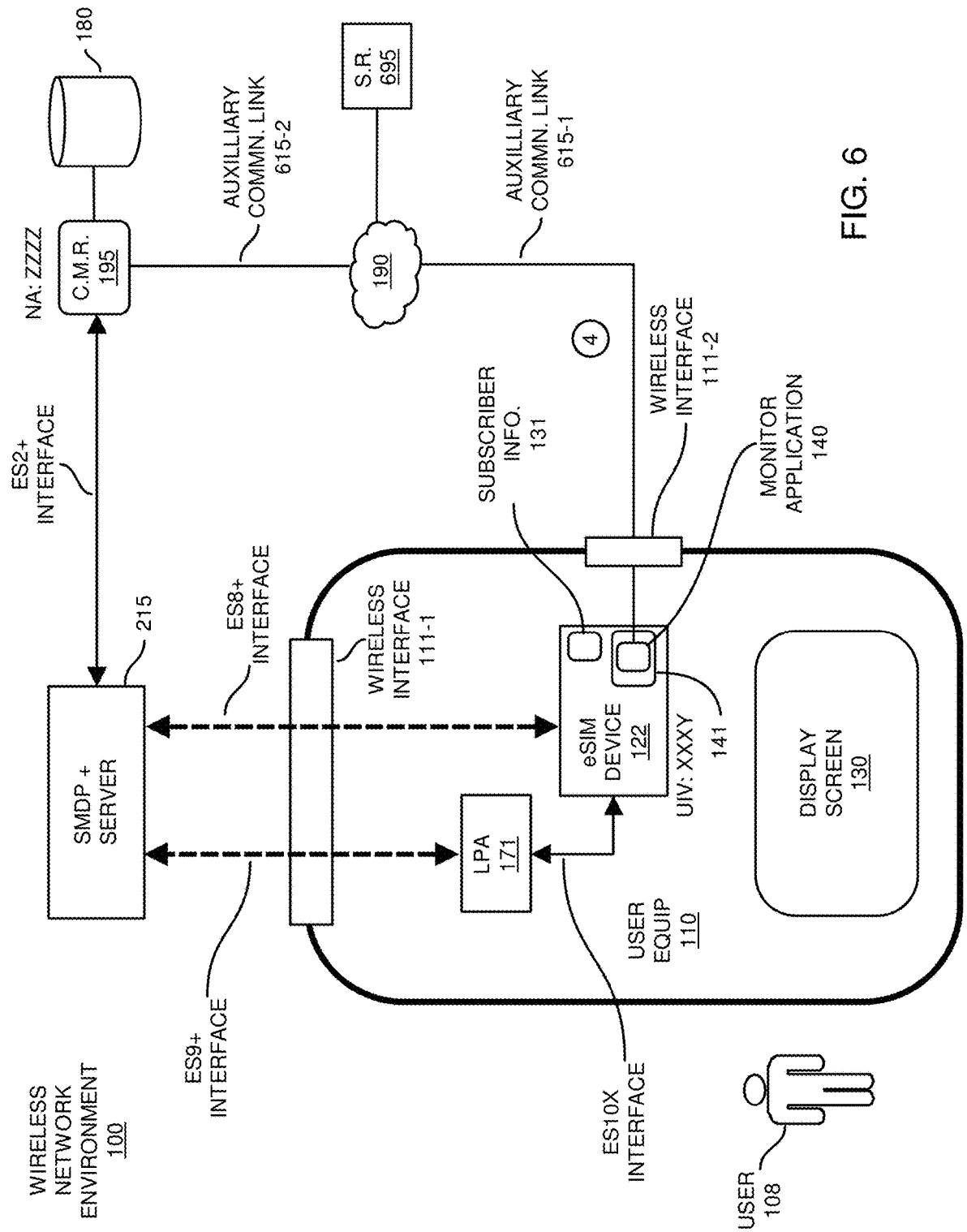
FIG. 6 is an example diagram illustrating detection of a respective auxiliary communication link according to embodiments herein.

FIG. 6 is an example diagram illustrating detection of a respective auxiliary communication link according to embodiments herein.

In operation #4, the monitor application 140 monitors and detects presence of the auxiliary communication link 615 (such as combination of auxiliary communication link 615-1 and auxiliary communication link 615-2) between the user equipment 110 and the communication management resource 195.

In one embodiment, the auxiliary communication link 615 (such as a persistent or temporary data connection) is established by the respective user 108 to communicate with one or more server resources 695. Although the auxiliary communication link 615 may be unrelated to the monitor application 140, the monitor application 140 can be configured to, unbeknownst to the user 108, communicate the messages in queue 410 to the communication management resource 195.

Additionally, or alternatively, the monitor application 140 can be configured to establish the wireless communication link 615 as an alternative to waiting for detection of an existing data connection established by the user 108 between the user equipment 110 and the network 190.

As further discussed below, in response to detecting the availability of the auxiliary communication link 615, or after establishing the communication link 615, the monitor application 140 initiates transmission of the respective one or more messages (such as message #1, message #2, message #3, etc.) in queue 410 over the auxiliary communication link 615 to the communication management resource 195. Accordingly, the communication management resource 195 and corresponding wireless network service provider as specified by the subscriber information 131 is notified that an attribute associated with the eSIM device 122 and attribute of the subscriber information 131 has been modified (such as deleted, disabled, etc).

Figure 7:
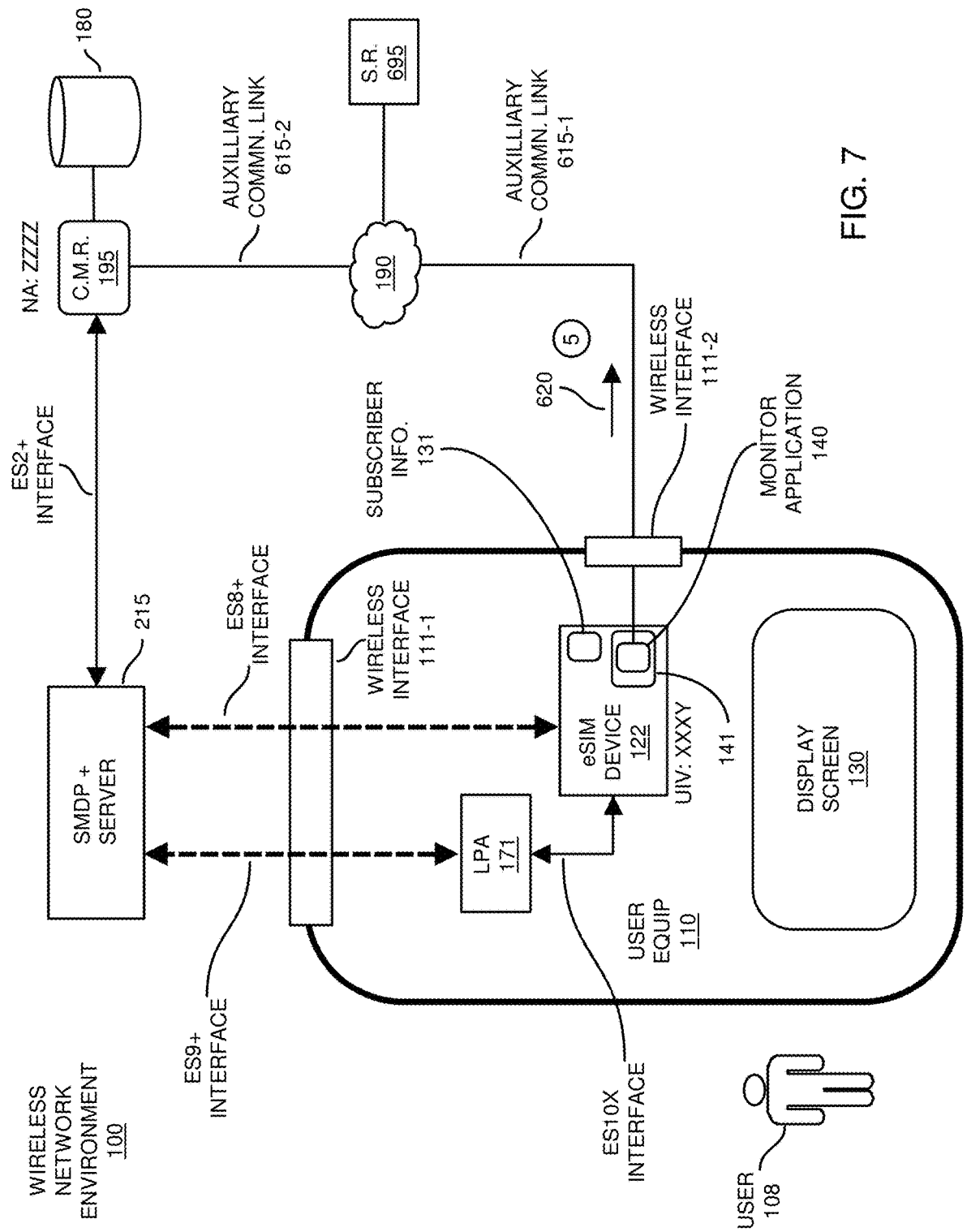
FIG. 7 is an example diagram illustrating communication of one or more queued messages over an auxiliary communication link according to embodiments herein.

FIG. 7 is an example diagram illustrating communication of one or more queued messages over the auxiliary communication link according to embodiments herein.

As previously discussed, in one embodiment, the monitor application 140 is a supplemental application provided by a respective wireless network service provider providing the user equipment 110 wireless network access such as via wireless communication link 615 supported by wireless interface 111-2 (such as Wi-Fi™, cellular, Long-Term Evolution, 5G, 4G, new radio, etc.) of the user equipment 110.

For example, the user 108 of the user equipment 110 may establish the communication link 615 to communicate with the server resource 695 and retrieve content.

In operation #5, subsequent to detecting and/or choosing the communication link 615, via communications 620, the monitor application 140 associated with the wireless network service provider communicates any messages associated with the subscriber information 131 (and/or eSIM device 122) over the detected or established communication link 615 (such as other than through wireless interface 111-1 and the primary wireless connection such as ES9+ and ES8+ interface).

In one embodiment, the monitor application 140 is configured to include a network address ZZZZ (unique identifier value) of the communication management resource 195. When communicating the messages in queue 410 over the network 190, the monitor application 140 include the network address ZZZZ in respective data packets so that the messages are delivered to the communication management resource 195.

Thus, in one embodiment, the communication link 615 detected by the monitor application 140 is a bypass path (such as out-or-band path) with respect to the primary wireless connection (such as ES8+, ES9+, etc., through wireless interface 111-1) of the user equipment 110 between the eSIM device 122 and the remote management resource such as one or more of server 215 and communication management resource 195.

Additionally, embodiments herein include an eSIM based applet (monitor application 140) that provides a report on eSIM status and network status to a remote entity (wireless network service provider) such as communication management resource 195. The reporting will be done from the monitor application 140 on the eSIM device 122 to a back end server (such as communication management resource 195) via a communication link 615 such as providing "out of band" messaging with respect to communications through wireless interface 111-1. As previously discussed, such notification of eSIM status and messages provided by the monitor application 140 to the communication management resource 195 may be known or unknown to the subscriber.

Although eSIM status could also be captured on the eSIM platform (such as SMDP+ server 215), there is no guarantee that the status of the eSIM device 122 is accurately sent to the server 215 and/or communication management resource 195 as the communication links through the wireless interface 111-1 are not guaranteed and could result in non-delivery of status information. Use of the auxiliary communication link 615 provides the user equipment 110 and corresponding monitor application 140 an alternative way to communicate monitor information such as messages and corresponding timestamp information in queue 410 to the communication management resource 195.

There is currently no other way to check on the eSIM status.

In one embodiment, a sampling of eSIM information and network status messages captured by the monitor application 140 (such as eSIM applet) include:
1. one or more status message such as indicating that the subscriber information 131 (eSIM information) is downloaded and installed on the eSIM device 122,
2. one or more status messages (via periodic polling) indicating that the eSIM device 122 is active or operational
3. one or more status messages indicating that the eSIM device 1222 is disabled or subscriber information 131 has been deleted (such as absence of polling information communicated to the communication management resource 195)
4. one or more status messages indicating that the user equipment 110 is in a roaming state (such as either domestic or international)
5. one or more status messages regarding a current location of the user equipment 110; the communication management resource 195 provides a display message relevant to the location for display on the display screen 130 of the user equipment 110. The communication management resource 195 can be configured to display different messages in the display screen 130 in response to detecting the user equipment 110 at different locations.
6. one or more status messages reporting a state of the eSIM device 122

Note again that embodiments herein include the monitor application 140 (such as executed applet on the eSIM device 122 or programmable hardware 141) to send status messages from the user equipment 110 to the communication management resource 140 using an "out of band" method. This can be done by utilizing the mobile data connection (such as wireless communication link 615) of the user equipment 110 itself to communicate information about the state of the eSIM device 122 and/or corresponding subscriber information 131.

Further, embodiments herein do not rely on the standard GSMA connections to communicate with the SMDP+ server. Rather the monitor application 140 (an applet) executed on the eSIM device 122 sends a periodic polling update of messages in queue 410 to the communication management resource 140 (such as Network Operator systems). This update will include information such as the state of the eSIM device 122.

Still further, note further that the monitor application 140 can be configured to monitor and detect other conditions associated with the eSIM device 122. For example, in one embodiment, the monitor application 140 detects and reports on whether the customer is roaming domestically or internationally; any such reporting messages to the communication management resource 140 can include corresponding device related information.

In one embodiment, if the user 108 deactivates or deletes the subscriber information 131 (such as eSIM information), the absence of the polling message by the monitor application 140 (because it has no messages or event information to send) will indicate that the eSIM device 122 is non-active and may require intervention by the wireless network service provider (such as Customer Ops or Network Ops). Thus, failure to send any messages by the monitor application 140 can indicate a respective status of the user equipment 110 and/or corresponding eSIM device 122 or subscriber information 131.

In further example embodiments, the monitor application 140 can be configured to send heartbeat messages to the communication management resource 195. The heartbeat messages indicate that the eSIM device 122 and/or subscriber information 131 is operating properly to provide the user equipment 110 wireless access according to a respective wireless network plan to which the user 108 subscribes.

In one embodiment, the monitor application 140 (such as eSIM applet) is a simple Java™ applet (including executable instructions or code) having an assigned network address. The monitor application 140 is a port endpoint and supports encrypted communications with the communication management resource 195. In one embodiment, the messages communicated by the monitor application 140 to the communication management resource 195 will be decrypted by the communication management resource 195 (such as OSS systems) and stored internally for analytical purposes.

Capturing this state information of the subscriber information 131 will help to: i) capture eSIM states accurately, ii) ensure an additional "out of band" method to receive updates from the eSIM device 122 without total dependence on standards based notifications from the eSIM device 122, iii) utilize the eSIM applet (monitor application 140) for capturing additional information like roaming details associated with the user equipment 110, iv) provide analytics on data received from eSIM device 122, etc.

Figure 8:
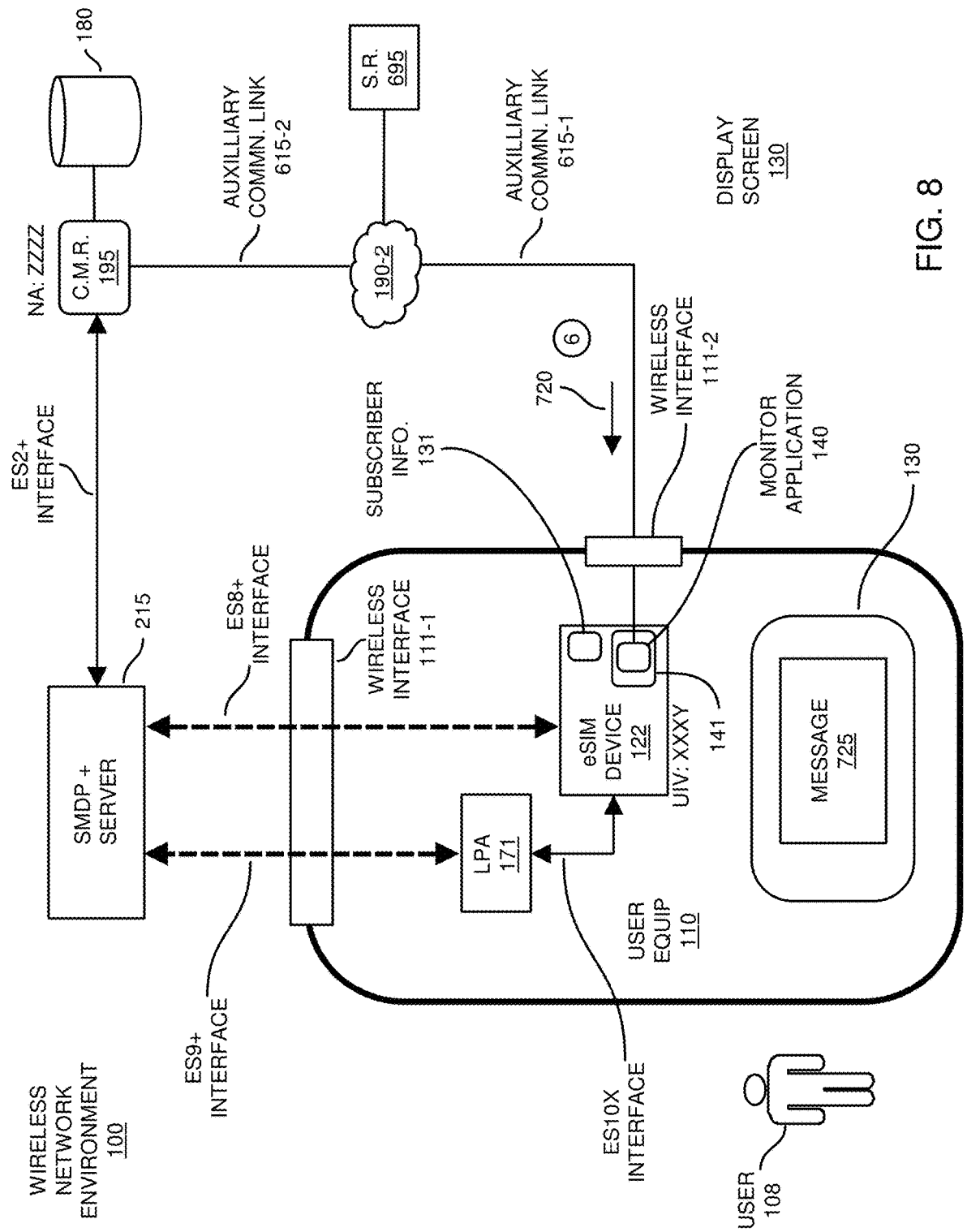
FIG. 8 is an example diagram illustrating receipt of one or more messages from a wireless network service provider and execution of same at a mobile communication device according to embodiments herein.

FIG. 8 is an example diagram illustrating receipt of messages from a wireless network service provider according to embodiments herein.

As previously discussed, communication of the status messages in queue 410 to a remote entity such as communication management resource 195 can result in receipt of a response (such as communications 720). For example, in one embodiment, in response to communicating the status associated with the subscriber information 131 over the network 190 to the communication management resource 195, the monitor application 140 receives one or more response message over the network from the communication management resource 195 or other entities. In one embodiment, the one or more messages are directed to a user 108 of the mobile communication device from the communication management resource.

In accordance with further example embodiments, the executed monitor application 140 detects a location of the user equipment 110 in a geographical region. The monitor application 140 then communicates the location information indicating the current location of the user equipment 110 to the remote communication management resource 195 (wireless network service provider). Accordingly, the wireless network service provider is aware of a location of the user equipment 110. If desired, the monitor application 140 receives one or more display messages from remote management entity (communication management resource 195) for display on a respective display screen 130 of the user equipment 110. The messages on display screen 130 as sent from the communication management resource 195 vary depending on a location of the user equipment 110 as reported to the communication management resource 195.

Accordingly, embodiments herein include tracking a location of the user equipment 110 over time and reporting such information to the communication management resource 195.

Figure 9:
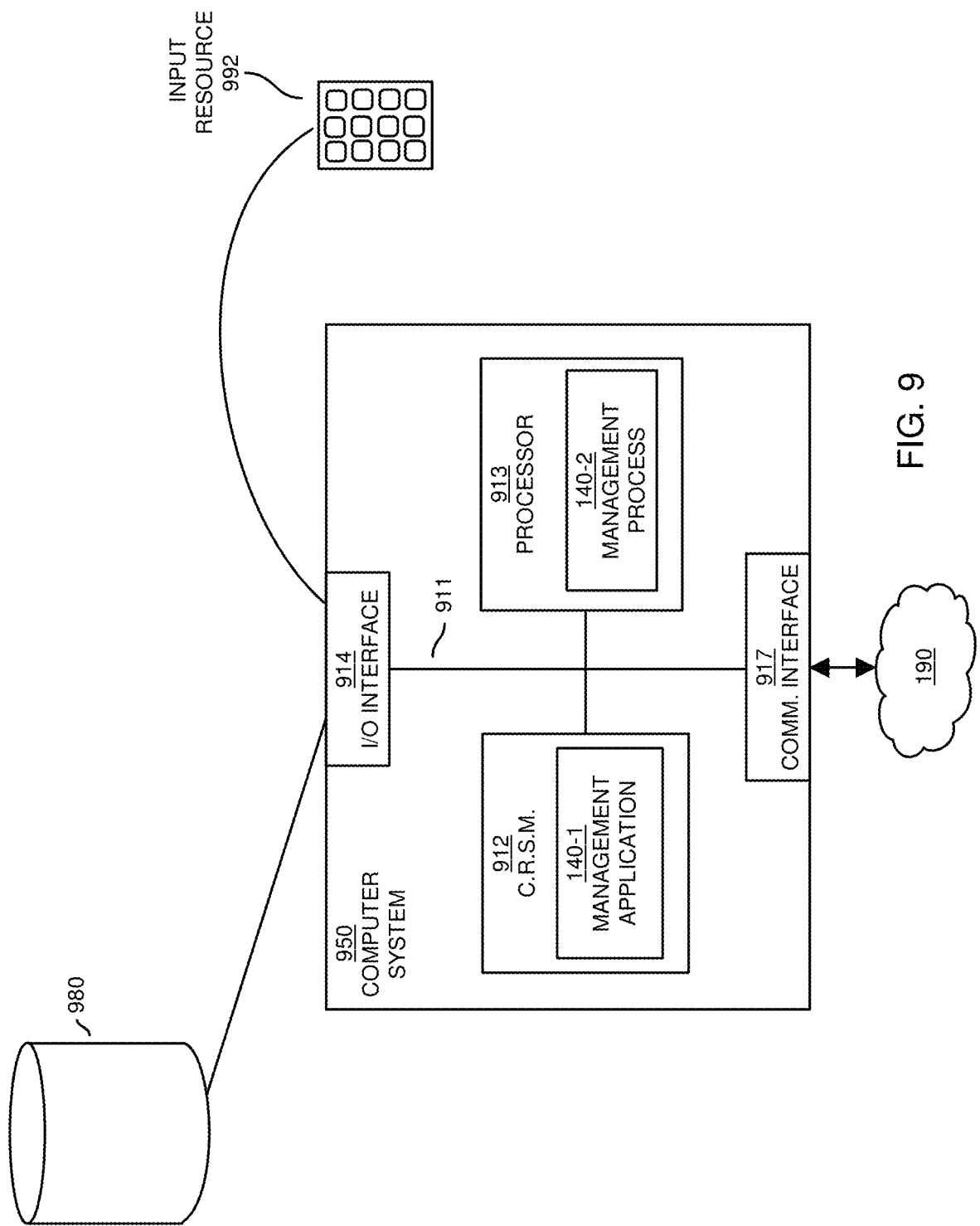
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as each of one or more wireless communication devices, communication management resource 195, user equipment 110, eSIM device 122, monitor application 140, etc.) as discussed herein can be configured to include computer processor hardware and/or corresponding executable (software) instructions to carry out the different operations as discussed herein.

As shown, computer system 950 of the present example includes an interconnect 911 coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with monitor application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in in the monitor application 140-1 stored on computer readable storage medium 912. Execution of the monitor application 140-1 produces monitor process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowchart in FIG. 10. Note that the steps in the flowcharts below can be executed in any suitable order.

Figure 10:
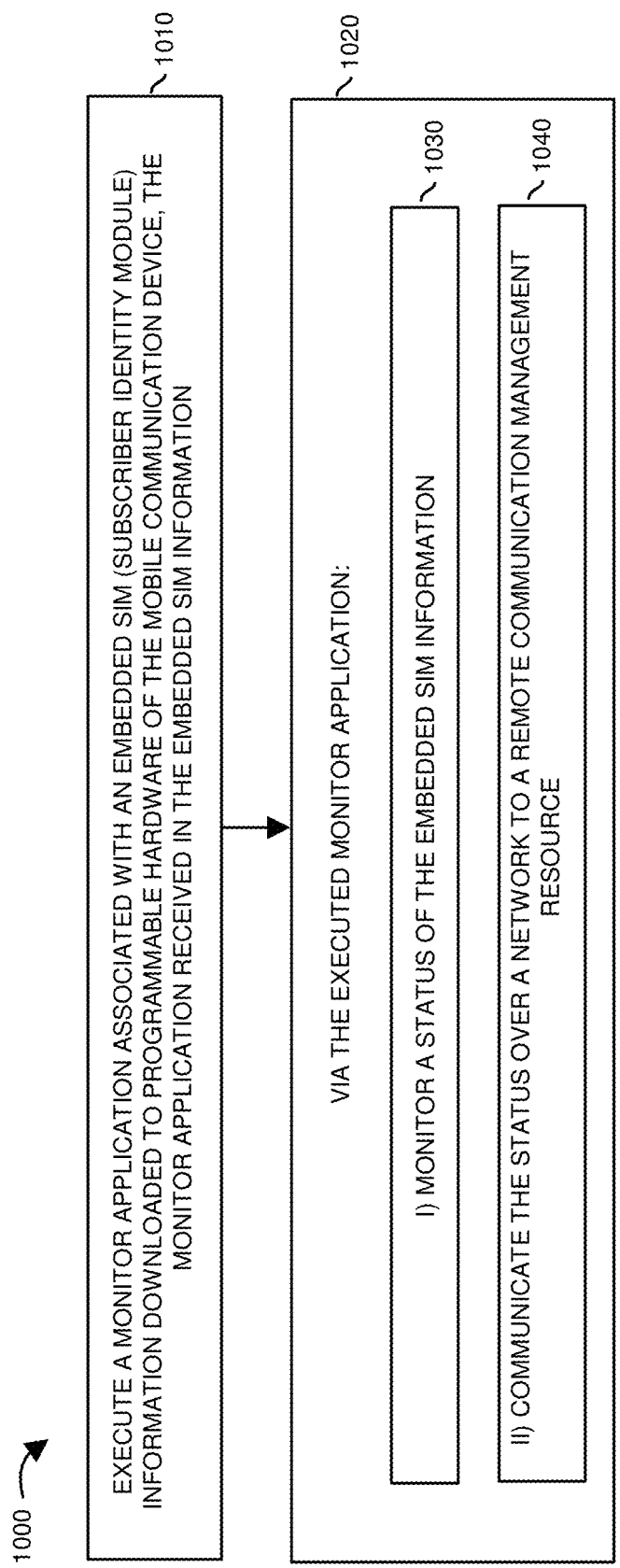
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the user equipment 110 (mobile communication device) executes a monitor application 140 associated with embedded SIM (subscriber identity module) information 131 downloaded to programmable hardware 141 of the user equipment 110. In one embodiment, the monitor application 140 is received as an applet in the embedded SIM information 131 received by the user equipment 110.

In processing operation 1020, the monitor application 140 monitors a status of the embedded SIM information 131.

In processing operation 1030, the monitor application 140 communicates the detected status associated with the subscriber identity information 131 over a network to a remote communication management resource 195.

Note again that techniques herein are well suited to facilitate wireless communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a mobile communication device:
   executing a monitor application associated with embedded SIM (Subscriber Identity Module) information downloaded to programmable hardware of the mobile communication device, the monitor application received along with the embedded SIM information;
   wherein executing the monitor application associated with the embedded SIM (Subscriber Identity Module) information includes: i) retrieving the monitor application from the embedded SIM information, and ii) installing the monitor application on the mobile communication device; and
   via the executed monitor application:
   i) monitoring a status of the embedded SIM information; and
   ii) communicating the status over a network to a remote communication management resource.

2. The method as in claim 1, wherein the status indicates an operation applied to the embedded SIM information by a user of the mobile communication device during the monitoring.

3. The method as in claim 1 further comprising:
   executing the monitor application via the programmable hardware receiving the embedded SIM information.

4. The method as in claim 1 further comprising:
   in response to communicating the status over the network to the communication management resource, receiving a message over the network, the message directed to a user of the mobile communication device from the communication management resource.

5. The method as in claim 1, wherein the executed monitor application is supplemental with respect to a SIM management application on the mobile communication device that monitors the status of the embedded SIM information and provides notification of the status over a primary wireless connection to the remote communication management resource.

6. A method comprising:
at a mobile communication device:
executing a monitor application associated with embedded SIM (Subscriber Identity Module) information downloaded to programmable hardware of the mobile communication device, the monitor application received as a portion of the embedded SIM information;
via the executed monitor application:
i) monitoring a status of the embedded SIM information; and
ii) communicating the status over a communication link of a network to a remote communication management resource, the communication link being a bypass path with respect to a primary wireless connection; and
wherein the executed monitor application is supplemental with respect to a SIM management application on the mobile communication device, the SIM management application operative to monitor the status of the embedded SIM information and provide notification of the status over the primary wireless connection to the remote communication management resource.

7. The method as in claim 1, wherein the embedded SIM information downloaded to the programmable hardware includes a subscriber identity of a user of the mobile communication device and authentication key information supporting wireless connectivity of the mobile communication device over the network.

8. The method as in claim 1 further comprising:
via the executed monitor application: queueing the status for subsequent delivery in a message to the remote communication management resource until a communication link in the network is available to communicate the status to the remote communication management resource.

9. The method as in claim 8 further comprising:
via the executed application:
monitoring the mobile communication device for presence of a persistent data connection used by the communication device to communicate over the network;
selecting the persistent data connection to communicate the status over the network to the remote communication management resource.

10. The method as in claim 9 further comprising:
communicating the status in the message over the persistent data connection unbeknownst to a user operating the mobile communication device.

11. The method as in claim 1, wherein the programmable hardware is embedded SIM hardware of the communication device.

12. The method as in claim 1 further comprising:
via the executed monitor application:
detecting a location of the mobile communication device; and
communicating location information indicating the location of the mobile communication device to the remote communication management resource.

13. A system comprising:
programmable hardware disposed on a mobile communication device, the programmable hardware operative to:
execute a monitor application associated with embedded SIM (Subscriber Identity Module) information downloaded to the programmable hardware of the mobile communication device, the monitor application received along with the embedded SIM information;
wherein execution of the monitor application associated with the embedded SIM (Subscriber Identity Module) information includes: i) retrieval of the monitor application from the embedded SIM information, and ii) installation of the monitor application on the mobile communication device; and
via the executed monitor application: i) monitor a status of the embedded SIM information, and ii) communicate the status over a network to a remote communication management resource.

14. The system as in claim 13, wherein the status indicates an operation applied to the embedded SIM information by a user of the mobile communication device during the monitoring.

15. The system as in claim 13, wherein the programmable hardware is further operative to:
execute the application received in the embedded SIM information.

16. The system as in claim 13, wherein the programmable hardware is further operative to:
in response to communicating the status over the network to the remote communication management resource, receive a message over the network, the message directed to a user of the mobile communication device from the remote communication management resource.

17. The system as in claim 13, wherein the executed monitor application is supplemental with respect to a SIM management application on the mobile communication device that monitors the status of the embedded SIM information; and
wherein the executed monitor application is further operative to provide notification of the status over a first wireless connection from the mobile communication device to the remote communication management resource.

18. A system comprising:
programmable hardware disposed on a mobile communication device, the programmable hardware operative to:
execute a monitor application associated with embedded SIM (Subscriber Identity Module) information downloaded to the programmable hardware of the mobile communication device, the monitor application received as a portion of the embedded SIM information; and
via the executed monitor application: i) monitor a status of the embedded SIM information, and ii) communicate the status over a communication link of a network to a remote communication management resource;
wherein the executed monitor application is supplemental with respect to a SIM management application on the mobile communication device that monitors the status of the embedded SIM information; and wherein the SIM management application is further operative to provide notification of the status over a first wireless connection from the mobile communication device to the remote communication management resource; and wherein the communication link is a bypass path with respect to the first wireless connection.

19. The system as in claim 13, wherein the embedded SIM information downloaded to the programmable hardware includes a subscriber identity of a user of the mobile communication device and authentication key information supporting wireless connectivity of the mobile communication device over the network.

20. The system as in claim 13, wherein the programmable hardware is further operative to:

via the executed monitor application: queue the status for subsequent delivery in a message to the remote communication management resource until a communication link in the network is available to communicate the status to the remote communication management resource.

21. The system as in claim 20, wherein the programmable hardware is further operative to:

via the executed monitor application:
monitor the mobile communication device for presence of a persistent data connection used by the communication device to communicate over the network; and
select the persistent data connection to communicate the status over the network to the remote communication management resource.

22. The system as in claim 21, wherein the programmable hardware is further operative to:

communicate the status in the message over the persistent data connection unbeknownst to the user operating the mobile communication device.

23. The system as in claim 13, wherein the programmable hardware is eSIM hardware.

24. The system as in claim 13, wherein the programmable hardware is further operative to:

via the executed monitor application:
detect a location of the mobile communication device; and
communicate location information indicating the location of the mobile communication device to the remote communication management resource.

25. Computer-readable storage hardware having instructions stored thereon, the instructions, when carried out by computer processor hardware, cause the computer processor hardware to:

execute a monitor application associated with embedded SIM (Subscriber Identity Module) information downloaded to programmable hardware of a mobile communication device, the monitor application received along with the embedded SIM information;

wherein execution of the monitor application associated with the embedded SIM (Subscriber Identity Module) information includes: i) retrieval of the monitor application from the embedded SIM information, and ii) installation of the monitor application on the mobile communication device; and via the executed monitor application:
i) monitor a status of the embedded SIM information; and
ii) communicate the status over a network to a remote communication management resource.

26. The method as in claim 1, wherein communicating the status over the network includes:

communicating status information over a communication link, the status information indicating the status, the communication link being a secondary wireless connection with respect to a primary wireless connection between the communication device and the remote communication management resource.

27. The method as in claim 1 further comprising:

retrieving the embedded SIM information including the monitor application at the mobile communication device in response to transmission of communications from the mobile communication device.

28. The method as in claim 1 further comprising:

receiving the embedded SIM information including the monitor application at the mobile communication device in response to communicating an identity of the mobile communication device to communication management hardware disparately located with respect to the mobile communication device.

29. The method as in claim 1, wherein the programmable hardware is an eSIM device residing in the mobile communication device.

30. The method as in claim 1 further comprising:

via the executed monitor application:
i) detecting an event associated with the embedded SIM information;
ii) producing a timestamp indicative of a time at which the event associated with the embedded SIM information occurs; and
iii) communicating notification of the event and the timestamp to the remote communication management resource, the timestamp indicating the time at which the event occurs.

31. The method as in claim 30, wherein the event is a modification of the embedded SIM information.

32. The method as in claim 1, wherein the status information indicates an operational status of the programmable hardware.

33. A method comprising:

at a mobile communication device:
executing a monitor application associated with embedded SIM (Subscriber Identity Module) information downloaded to programmable hardware of the mobile communication device, the monitor application received as a portion of the embedded SIM information;

via the executed monitor application:
i) monitoring a status of the embedded SIM information; and
ii) communicating the status over a network to a remote communication management resource;

the method further comprising:
via the monitor application, producing first status information and second status information associated with the embedded SIM information; and
wherein communicating the status over the network to the remote communication management resource includes: i) transmitting the first status information from a first wireless interface of the communication device to the remote communication management resource; and ii) transmitting the second status information from a second wireless interface of the communication device to the remote communication management resource.

34. The method as in claim 1, wherein the monitor application is a supplemental application provided by a respective wireless network service provider providing the mobile communication device wireless network access via the embedded SIM information.

35. The method as in claim 1, wherein the status communicated to the remote communication management resource indicates a location of the mobile communication device.

36. The method as in claim 1 further comprising:
via the executed monitor application: i) receiving a notification from the remote communication management resource, and ii) displaying the notification on a display screen of the mobile communication device.

37. A method comprising:
at a mobile communication device:
executing a monitor application associated with embedded SIM (Subscriber Identity Module) information downloaded to programmable hardware of the mobile communication device, the monitor application received as a portion of the embedded SIM information;
via the executed monitor application:
  i) monitoring a status of the embedded SIM information; and
  ii) communicating the status over a network to a remote communication management resource;
via the executed monitor application: i) receiving a notification from the remote communication management resource, and ii) displaying the notification on a display screen of the mobile communication device; and
wherein the notification depends on a location of the mobile communication device as reported by the executed monitor application to the remote communication management resource.

* * * * *